July 15, 1924.
J. K. RUTHS
1,501,623
STEAM ACCUMULATOR APPARATUS FOR STEAM PLANTS
Filed Nov. 1, 1919    2 Sheets-Sheet 1
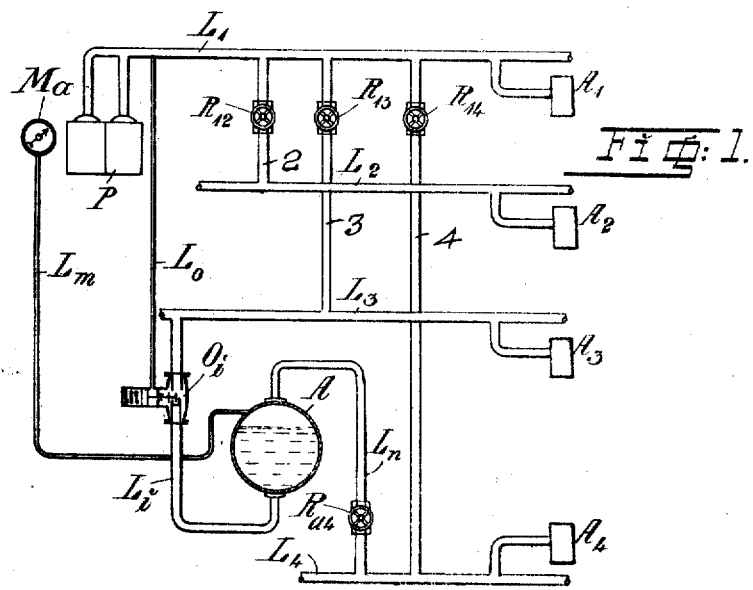

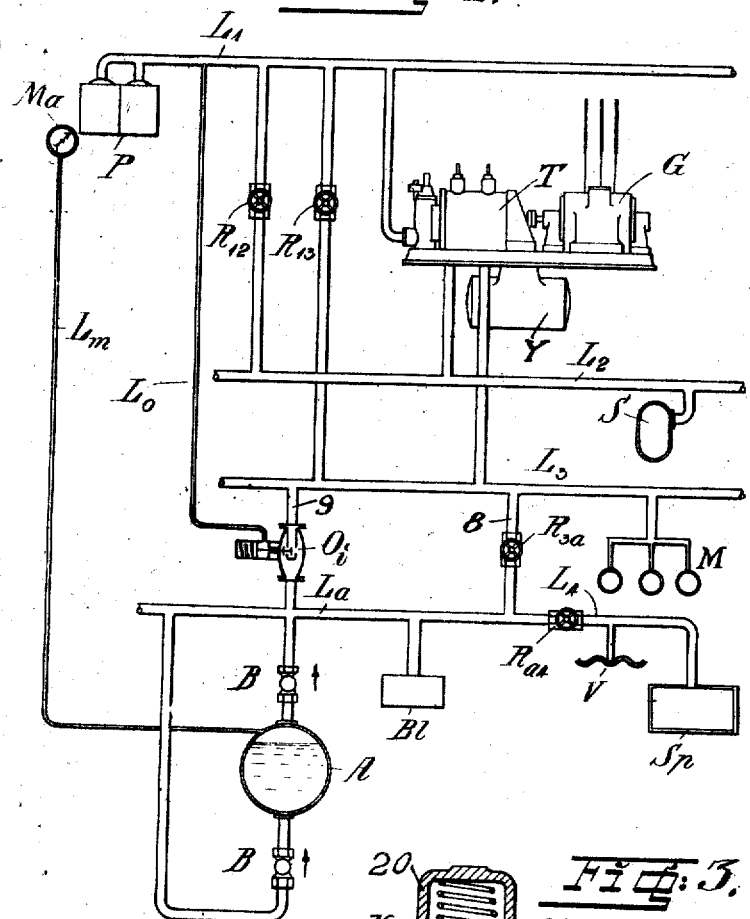
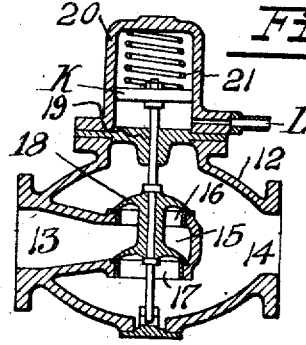

Patented July 15, 1924.

1,501,623

UNITED STATES PATENT OFFICE.

JOHANNES KARL RUTHS, OF DJURSHOLM, SWEDEN, ASSIGNOR TO AKTIEBOLAGET VAPORACKUMULATOR, OF STOCKHOLM, SWEDEN, A CORPORATION.

STEAM-ACCUMULATOR APPARATUS FOR STEAM PLANTS.

Application filed November 1, 1919. Serial No. 335,114.

*To all whom it may concern:*

Be it known that I, JOHANNES KARL RUTHS, subject of the King of Sweden, residing at Djursholm, in the Kingdom of Sweden, have invented certain new and useful Improvements in Steam-Accumulator Apparatus for Steam Plants, of which the following is a specification.

This invention relates to steam plants in which a steam accumulator is provided to receive the surplus steam not for the moment required by the steam consumers, and acting to deliver said steam when needed, the object being to bring about an independence between the steam generation and the steam consumption. In an application filed by me June 20, 1919, Serial No. 305,622 there is described and claimed such a type of steam plant in which there is arranged a controlling means in the conduit supplying the accumulator with steam, the said controlling means acting to control the steam supply to the accumulator in accordance with the pressure in the conduit in front of said means, and acting to maintain said pressure at a practically constant value. In said application there is disclosed a plant having a plurality of conduits carrying steam under different pressures with a plurality of such controlling means arranged between the conduits so as to maintain said different pressures practically constant, each of said controlling means being actuated by the pressure in the conduit in front of such controlling means.

The present invention is an improvement on the steam plant of said application, and has for its main object to maintain practically constant pressures in the respective conduits by the employment of a single controlling means, which, in accordance with my present invention is arranged in a conduit by which the accumulator is supplied, but is actuated by the generator pressure and operates to increase the steam supply to the accumulator when said pressure rises above a predetermined value, while decreasing the steam supply when the said pressure falls below a predetermined value.

The invention will be described more in detail with reference to the examples shown in the accompanying drawings, in which:

Fig. 1 is a diagrammatic view of a steam plant having my invention embodied therein in one form.

Fig. 2 is a similar view of a plant substantially the same as that shown in Fig. 1, but in which a steam motor is arranged between the conduits.

Fig. 3 is a sectional view of a valve mechanism constituting the means for controlling the supply of steam to the accumulator.

Referring to the drawings:

Referring to Fig. 1, P designates a steam generator, from which leads a main conduit $L_1$. $L_2$, $L_3$ and $L_4$ designate secondary conduits which are connected with the main conduit by means of connecting conduits 2, 3 and 4 respectively. A designates a steam accumulator connected with the conduit $L_3$ and receiving steam therefrom through a conduit $L_i$, and connected to conduit $L_4$ by a discharge conduit $L_n$. Reducing valves $R_{12}$, $R_{13}$, and $R_{14}$ are inserted respectively in the connecting conduits 2, 3 and 4, and a reducing valve $R_{a4}$ is inserted in the discharge conduit $L_n$.

The construction of the several reducing valves is such, as is familiar to those skilled in the art, that on a decrease of the pressure behind the valve below a predetermined value, the flow of steam through the valve from the main conduit will be increased, and on an increase of the said pressure above a predetermined value, the steam flow will be decreased. These reducing valves are so set relatively to each other that different degrees of pressure will be maintained in the secondary conduits, the highest pressure, in the form of the invention shown in Fig. 1, being in conduit $L_2$, the next lower pressure in conduit $L_3$, and the lowest pressure in conduit $L_4$. From the main conduit a steam consumer $A_1$ is supplied with steam; and steam consumers $A_2$, $A_3$ and $A_4$ are supplied with steam respectively from the conduits $L_2$, $L_3$ and $L_4$.

It will be understood that the pressure in the accumulator may vary between the pressure in secondary conduit $L_4$ and the pressure in the secondary conduit $L_3$.

In accordance with the present invention, there is arranged in the conduit $L_i$ a controlling means $O_i$ actuated by the pressure of steam in the main conduit through a conduit $L_o$, and operating to increase the steam supply to the accumulator upon an increase of the pressure in the main conduit above a predetermined value, while decreasing the steam supply upon a decrease of said pressure below a predetermined value. This controlling means is in the present instance in the form of a valve mechanism which I term an "over-flow valve" and which is shown in detail in one form by way of example in Fig. 3, presently to be described.

In the operation of the plant thus described, if for example the pressure in the secondary conduit $L_2$ should increase above a predetermined value, due to decreased steam consumption in the steam consumer $A_2$, the reducing valve $R_{12}$ will throttle the steam supply to conduit $L_2$ from the main conduit, and consequently the pressure in the main conduit will increase sufficiently to operate the over-flow valve $O_1$ and thereby admit steam from the conduit $L_3$ to the accumulator. The pressure in the conduit $L_3$ will under these conditions decrease sufficiently to operate the reducing valve $R_{13}$ which will increase the flow of steam from the main conduit to the conduit $L_3$. As a result of these actions of the several valves and controlling means, it will be seen that the steam not required for the operation of the consumer $A_2$, which before was led through the reducing valve $R_{12}$, is led through the reducing valve $R_{13}$ to the conduit $L_3$ and thence through the over-flow valve $O_1$ and conduit $L_1$ to the accumulator.

On the other hand if the pressure in conduit $L_2$ should decrease, due to increased steam consumption by the consumer $A_2$, the reducing valve $R_{12}$ will admit more steam to conduit $L_2$ and consequently the pressure in the main conduit will decrease and the over-flow valve will throttle the steam flow to the accumulator. The pressure in conduit $L_3$ will therefore increase and reducing valve $R_{13}$ will throttle the steam flow to said conduit. In like manner the steam supply to the accumulator will be controlled on the increase or decrease of pressure in conduit $L_3$, or in the main conduit $L_1$.

If again the pressure in conduit $L_4$ should increase or decrease, reducing valve $R_{14}$ will control the steam supply from the accumulator to the conduit $L_4$, and thereby maintain a practically constant pressure therein.

Reducing valve $R_{14}$ is adjusted to open and permit steam to pass from the main conduit $L_1$ only when reducing valve $R_{14}$ is fully opened.

From the above description it will be seen that the accumulator will take care of all variations in steam consumption in the plant wherever they occur so that the steam generators are relieved thereof, and the generator pressure can be maintained at a practically constant value and therefore there is no necessity for regulating the heat supply to the boiler so long as the boilers supply steam corresponding to the average steam consumption of the whole plant.

Fig. 2 shows a steam plant substantially similar to that shown in Fig. 1, but in this case a steam motor, a turbine T of the double extraction type, is arranged to receive steam from the main conduit and to deliver steam respectively to the secondary conduits $L_2$ and $L_3$, the turbine being provided with a condensor Y and being shown as driving an electric generator G. The pressure in conduit $L_4$ is lower than in $L_3$; the pressure in conduit $L_3$, lower than in $L_2$; the pressure in conduit $L_2$ lower than in $L_1$.

The conduits $L_2$, $L_3$ and $L_4$ are shown as supplying steam respectively to a steam consumer S which may be in the form of a pulp digestor, a steam consumer M which may be in the form of a paper making machine, and steam consumers $S_p$ and V which may be in the form respectively of a distilling apparatus and a heating radiator.

In the case of Fig. 2 a conduit $L_a$ is also provided, to which the accumulator A is connected in parallel, and non-return valves B, B are inserted in the connections between the accumulator and the conduit $L_a$, the direction of the steam flow through the non-return valves being indicated by arrows. The conduits $L_1$, $L_2$, $L_3$ and $L_4$ have substantially constant pressure of different degrees, but the pressure in line $L_a$ varies with the variations in the accumulator pressure.

Reducing valve $R_{a4}$ of Fig. 1 is in the case of Fig. 2 inserted between the secondary conduits $L_a$ and $L_4$, and from the conduit $L_a$ a steam consumer B1 which may be in the form of a bleachery is supplied with steam.

Further in Fig. 2 a reducing valve $R_{3a}$ is inserted in a connecting conduit 8 between the secondary conduits $L_3$ and $L_a$ which reducing valve will permit steam to flow from conduit $L_3$ to conduit $L_a$ and thence to the consumer, upon a decrease of pressure in the accumulator below a predetermined value.

The over-flow valve $O_1$ in this form of the invention is inserted in a conduit 9 connecting secondary conduit $L_3$ with conduit $L_a$ which valve is, as before, controlled by the generator pressure through a conduit $L_o$.

While Fig. 2 involves certain changes and additions as described, to the parts of the plant illustrated in Fig. 1, the general operation of the same, in so far as the principle of my invention is concerned, is similar to that described in connection with Fig. 1.

Fig. 3 shows a form of an over-flow valve $O_1$ by way of example, suitable for the realization of my invention. Here it will be seen that a valve casing 12 is formed with oppositely disposed ports 13 and 14 adapted to be connected in the conduit $L_1$ of Fig. 1 or conduit 9 of Fig. 2, the port 13 being connected with a chamber 15 extending into the casing and having aligned ports 16 and 17. These ports 16 and 17 are controlled by a balanced valve member 18 movable with a valve stem 19 guided in the casing and having connected with it a piston K sliding in a cylinder 20. The piston K is acted on at one side by a spring 21 arranged within the cylinder, and on the other side by the pressure of steam in the main conduit $L_1$ acting through the conduit $L_0$ which is connected to the cylinder. The arrangement is such that the pressure of steam in the conduit $L_1$ tends to open the valve, and the spring tends to close the same. Therefore on the increase of the steam pressure to a degree to overcome the spring, the valve will be opened. By further increase of the pressure in said conduit the steam supply to the accumulator will be increased, and on a decrease of the pressure in the conduit $L_1$ to a degree below the force of the spring, the latter will move the piston and the steam supply to the accumulator will be decreased.

In the forms of the plants above described, a pressure gage $M_a$ is shown connected by pipe $L_m$ to the accumulator, the purpose of which gage is described in my co-pending application Serial No. 305,622, and as this gage is not directly concerned with the present improvements, it will not be necessary to describe the same more fully herein.

Having thus described my invention, what I claim is:

1. In a steam plant the combination of a steam generator, a main conduit connected therewith, a secondary conduit receiving steam from the main conduit and adapted to supply steam to a steam consumer, means whereby a lower pressure is maintained in the secondary conduit than in the main conduit, a steam accumulator connected with the secondary conduit and adapted to supply steam to a steam consumer, and means controlling the supply of steam from the secondary conduit to the accumulator, said means being actuated by the pressure in the main conduit and operating to increase the steam supply to the accumulator when said pressure in the main conduit rises above a predetermined value, while decreasing the steam supply when the said pressure falls below a predetermined value.

2. In a steam plant, the combination of a steam generator, a main conduit connected therewith, a plurality of secondary conduits receiving steam from the main conduit, and adapted to supply steam to steam consumers, a plurality of means acting to maintain different pressures in the respective conduits, a steam accumulator connected with one of the secondary conduits, and a single means for controlling the steam supply to the accumulator from said secondary conduit, said single means operating to increase the steam supply to the accumulator when the pressure in the main conduit rises above a predetermined value, while decreasing the steam supply when the said pressure falls below a predetermined value.

3. In a steam plant the combination of a steam generator, a main conduit connected therewith, a secondary conduit, a connection between said secondary conduit and said main conduit, a reducing valve in said connection to maintain different degrees of pressure in the respective conduits, a steam accumulator connected with the secondary conduit, a steam consumer supplied with steam from the accumulator, and means for controlling the steam supply to the accumulator from said secondary conduit, said means operating to increase the steam supply to the accumulator when the pressure in the main conduit rises above a predetermined value, while decreasing the steam supply when said pressure falls below a predetermined value.

4. In a steam plant, the combination of a steam generator, a main conduit connected therewith, a plurality of secondary conduits carrying different degrees of pressure, a steam motor receiving steam from the main conduit and delivering steam to one of the secondary conduits, a consumer adapted to be supplied therefrom, a steam accumulator adapted to receive steam from the said secondary conduit receiving steam from the motor, and adapted to deliver steam to a second secondary conduit carrying a lower pressure than the said secondary conduit from which the accumulator is supplied, a consumer supplied with steam from the accumulator, and a single means for controlling the steam supply to the accumulator, said single means operating to increase the steam supply to the accumulator when the pressure in the main conduit rises above a predetermined value, while decreasing the steam supply when the pressure falls below a predetermined value.

5. In a steam plant, the combination of a steam generator, a main conduit connected therewith, two secondary conduits receiving steam from the main conduit and adapted to deliver steam to steam consumers, means to maintain different pressures in said secondary conduits, a steam accumulator connected with one of the secondary conduits, a valve member arranged in the connection between the secondary conduit and the accumulator, means actuated by the pressure in the main conduit and operating to move said valve member and increase the steam supply to the accumulator upon an increase of pressure in the main conduit above a predetermined value, while decreasing the steam supply upon a decrease of said pressure below a predetermined value, and a steam consumer supplied with steam from the accumulator.

6. In a steam plant, the combination of a steam generator, a steam conduit system receiving steam from said generator, a steam accumulator in said conduit system adapted to supply steam to a consumer, two conduits in said conduit system carrying lower pressures than in the generator and adapted to supply steam to steam consumers, means responsive to the generator pressure inserted between said conduits in a conduit leading to the accumulator to control the passage of steam toward the accumulator, said means operating to increase the passage of steam toward the accumulator when the pressure in the generator rises above a predetermined value, while decreasing the passage of steam toward said accumulator when the pressure falls below a predetermined value.

7. The combination as set forth in claim 6, a second means responsive to the accumulator pressure and operating on a decrease of the pressure in the accumulator below a predetermined value to admit steam to the consumer supplied by the accumulator from a conduit in the conduit system carrying a higher pressure than the last said predetermined value.

In testimony whereof I affix my signature in presence of two witnesses.

JOHANNES KARL RUTHS.

Witnesses:
 FRITZ C. HALLIER,
 P. H. BERGROTH.